Figure 4:
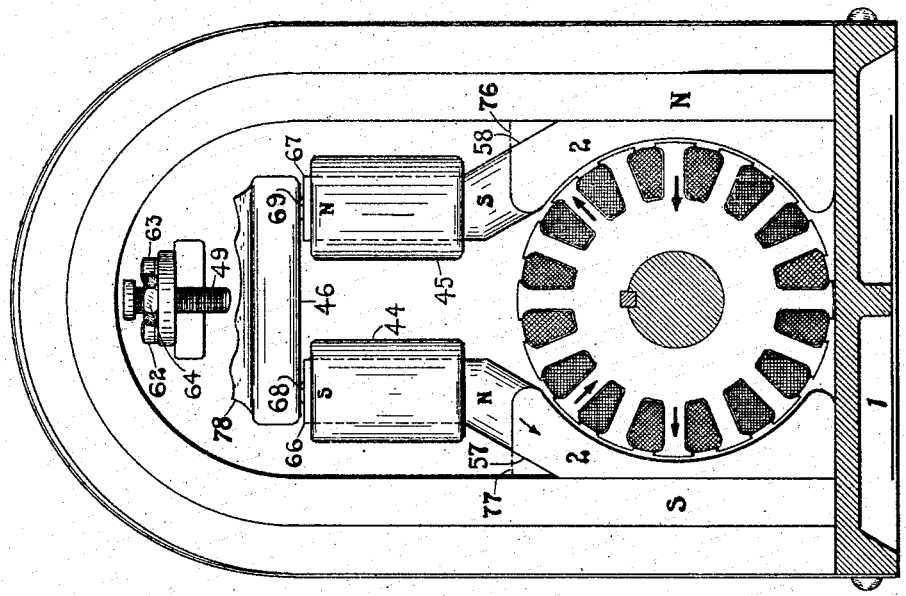

J. M. WILSON.
ELECTRIC CURRENT GENERATOR.
APPLICATION FILED NOV. 11, 1912.
1,136,078.
Patented Apr. 20, 1915.
3 SHEETS—SHEET 1.
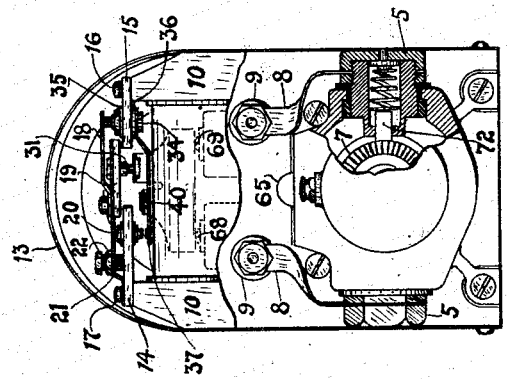
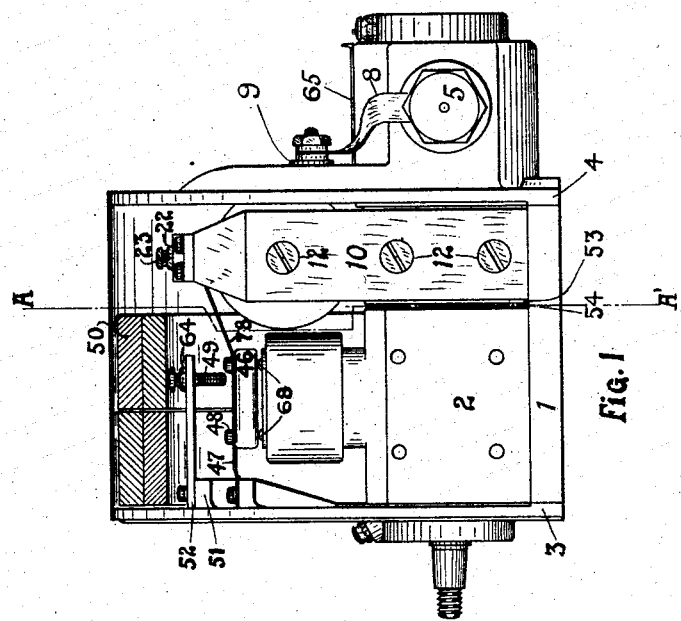
WITNESSES
INVENTOR
James M. Wilson
BY
A. D. T. Libby, his
ATTORNEY

J. M. WILSON.
ELECTRIC CURRENT GENERATOR.
APPLICATION FILED NOV. 11, 1912.

1,136,078.

Patented Apr. 20, 1915.
3 SHEETS—SHEET 2.

WITNESSES

INVENTOR
James M. Wilson
BY
ATTORNEY

UNITED STATES PATENT OFFICE.

JAMES M. WILSON, OF NEWARK, NEW JERSEY, ASSIGNOR TO SPLITDORF ELECTRICAL COMPANY, OF NEWARK, NEW JERSEY.

ELECTRIC-CURRENT GENERATOR.

1,136,078.            Specification of Letters Patent.           Patented Apr. 20, 1915.

Application filed November 11, 1912. Serial No. 730,567.

*To all whom it may concern:*

Be it known that I, JAMES M. WILSON, a citizen of the United States, and a resident of Newark, county of Essex, and State of New Jersey, have invented certain new and useful Improvements in Electric-Current Generators, of which the following is a specification.

My invention relates to improvements in electric-generators of the direct current class, and has for its object, to provide an improved form of direct current generator, adapted to be driven at variable rates of speed, such as on automobiles, launches and other moving vehicles, and to control the supply of current to the working circuit, according to the requirements.

An electric generator used on a variable speed vehicle, must have its working circuit controlled, so that it will close said working circuit at a substantially predetermined rate of speed of the vehicle and likewise of the rotating armature, and it should also have under self control, means to limit the energy in the working circuit to a safe predetermined amount, when the vehicle to which it is attached and which furnishes the motive power, is moving at a high rate of speed. While, in the form of my invention, shown in the drawings, permanent magnets are used, these are not necessary, as the field flux may be obtained by the ordinary electromagnetic means.

My invention also comprises novel details of improvement and combinations of parts that will be more fully hereinafter set forth, and then pointed out in the appended claims.

Figure 3:
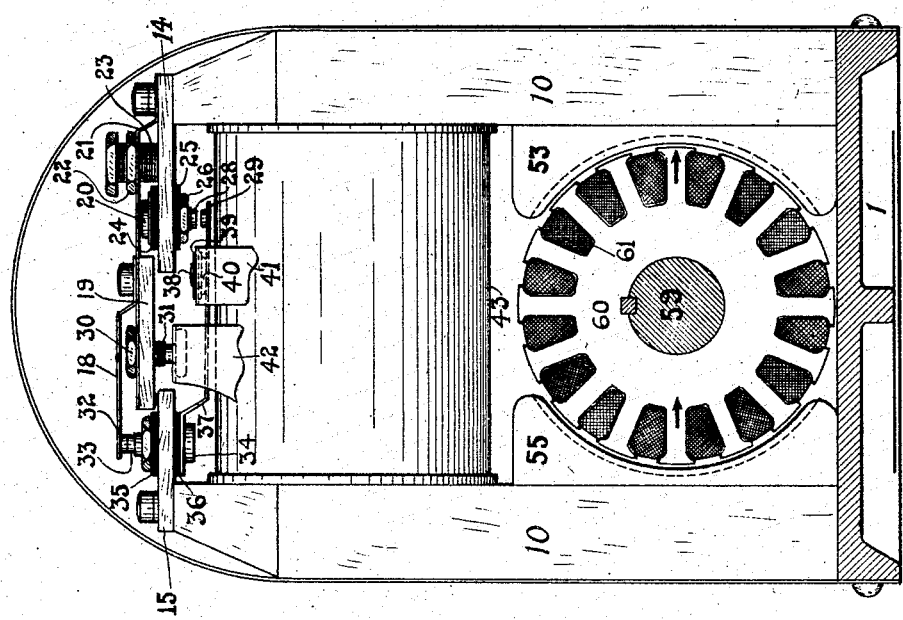
Figure 5:
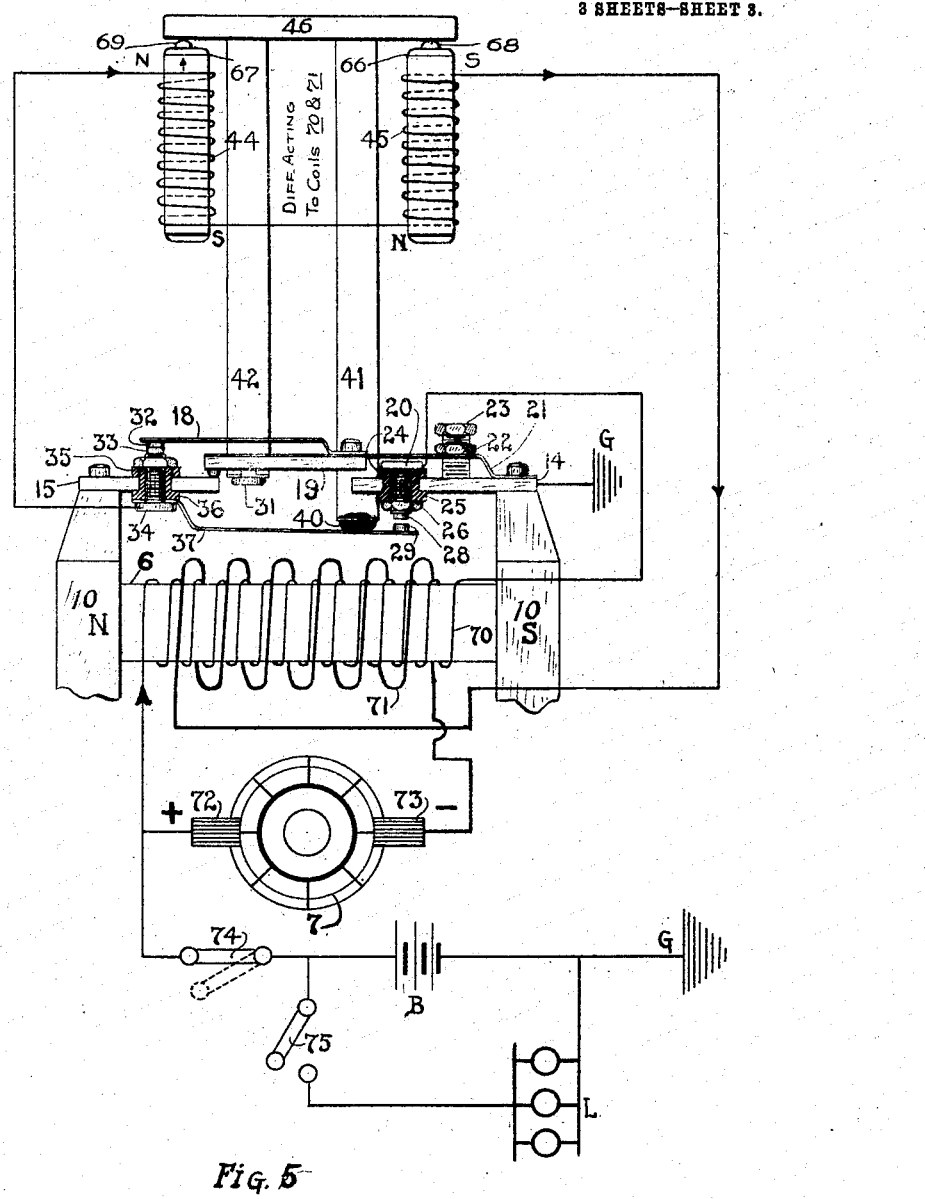

Reference is to be had to the accompanying drawings, forming a part hereof, wherein, Figure 1 is a longitudinal view of the generator, with the outside cover removed and a portion of the permanent magnets being cut away. Fig. 2 is an end view of Fig. 1, showing the upper portion of the end plate broken away, and also a portion of the housing over the brush and commutator. Fig. 3 is an enlarged view of a section to the right of A A' of Fig. 1. Fig. 4 is an enlarged view of a section to the left of A A', of Fig. 1, and Fig. 5 illustrates, diagrammatically the working circuit of the electric generator in combination with the two electromagnets, which control the said working circuit.

The similar numerals of reference indicate corresponding parts in the several views.

The numeral 1 indicates a non-magnetic base to which are attached the end plates 3 and 4 and on which are mounted the large pole pieces 2, and the smaller pole pieces 53 and 55. These latter pole pieces, however, are magnetically separated from the first two mentioned, as shown by the space 54.

Numerals 5 indicate the brush holder caps. Connections are made from these caps by the strips 8 to the line binding posts 9, which are properly insulated from the end plate, on which they are mounted. Attached to pole pieces 53 and 55, are pole shoes 10, between which is carried a yoke 6, the parts being held together by screws 12, or other suitable means. Upon this yoke is mounted an electro-magnetic coil 43, which is illustrated in Fig. 5 as having two windings, 70 and 71. Mounted on the top of the pieces 10, are pole pieces 14 and 15. To the pole piece 14 is secured a flexible member 21, carrying keeper 19 and also a second flexible member 18, at the end of which is mounted a contact, 32. An adjustment is provided for this keeper by means of an adjusting screw 23, having a lock member 22, to retain the same in proper adjustment. The pole piece 14 also carries an insulated member 20, being insulated from the pole tip 14 by the parts 24 and 25. On the end of member 20 is carried a contact 28. Pole piece 15 carries an insulated member 34, being insulated by members 35 and 36, on the end of which is a contact 33. This insulated member has also connected to it, a flexible member 37, which carries a contact 29. Under normal conditions, the contacts 28 and 29 are in engagement, and due to the resilience of member 21, keeper 19 is held away from the pole tips 14 and 15, thereby keeping the contacts 32 and 33 separated.

Mounted on the larger pole pieces 2, are pole extensions 66 and 67, which carry windings 44 and 45, which act together, forming an electromagnet, keeper of which is represented by 46. This keeper is supported from a support 51 by a resilient member 47, which is attached to the keeper by screws 48. The keeper 46 is kept from actual contact with the pole pieces 66 and 67 by means of non-magnetic points 68 and 69, so that it will never stick on being operated. An adjustment is provided for this keeper by means of the screw 49, locked in position by the nut 64, both of which are carried on an arm 52, which is of itself fastened to support 51 by screws 62 and 63. Attached to the keeper 46, is a resilient member, 78, forked into two members, 41 and 42. The fork 41 carries an insulated member 38, which is insulated from the fork 41 by insulating pieces 39 and 40. The fork 42 is provided with a hole in the end, through which plays freely a shouldered stud 31, said stud being fastened to the keeper 19 by the nut 30. In operation, when the electromagnetic windings 44 and 45 attract the keeper 46, the fork 42 engages the shouldered head of screw 31, pulling it downward, thus holding the keeper 19, which has been previously attracted to the poles 14 and 15, in its attracted position, and keeping the contacts 32 and 33 in engagement. Subsequently, on engagement of the fork 42 with the shouldered member 31, the fork 41 engages the flexible member 37 on the insulated stud 40, and carries the member 37 downward, separating the contacts 28 and 29.

While I have shown permanent magnets 50 as an additional source of magnetic flux, I do not wish to be limited to this construction, as I may use an ordinary electro-magnet connected in shunt of the armature circuit to produce the flux through the pole pieces 2 in the same degree as produced by the permanent magnets. A special feature of the construction of the large pole pieces 2 is illustrated in Fig. 4, in which the extensions 66 and 67 are bent away from the permanent magnets on the lines 57 and 58, instead of being in contact with the permanent magnets, as they would be if constructed to the same height as the pole pieces 53 and 55, and as indicated along the dotted lines 76 and 77. This construction forces the magnetic flux, due to the windings 44 and 45, to go down the pole extensions to such a point as will turn a portion of them through the armature, when current through the working circuit is sufficiently large, as indicated by the top arrows of Fig. 4. A portion of the flux, due to these windings, will also travel around through the permanent magnets, or other field material. The armature is illustrated by numeral 60 and the windings contained in the slots of the armature by 61. The shaft driving the armature is represented by 59. The entire machine may be inclosed in a dust proof case, as illustrated by 13, the commutator portion being covered by a cover 65, which can be readily pulled out to give inspection of the commutator bars represented by 7.

Considering now the operation of the machine, reference is had to Fig. 5, which shows the circuits with the contacts and controlling electromagnets, diagrammatically.

In Fig. 5, the working circuit is shown as being closed and can be traced as follows: From brush 72, through switch 74, battery B to ground G, thence through member 21 attached to pole piece 14, member 18, contacts 32 and 33, contact member 34, windings 44 and 45, winding 71 on the yoke 6, back to brush 73. An additional working circuit is illustrated from one side of battery B, through switch 75 when closed, through lamps L to the other side of battery, the battery and lamps, in this case, being in multiple in the working circuit. A shunt circuit may be traced before the working circuit is closed at contacts 32 and 33, and before the contacts 28 and 29 are opened, through the brush 72, through windings 70 on the yoke 6. From the insulated member 20, contacts 28 and 29, flexible member 37, member 34, windings 44 and 45, winding 71 on yoke 6, back to brush 73, thus giving what is known as a long shunt connection. The windings 70 and 71 on the yoke 6 produce magnetic fluxes through the armature 60 in the same direction as produced by the permanent magnets, or their equivalent, while the windings 44 and 45, acting together to form one electromagnet, produce a flux, a portion of which is in opposition to the above mentioned fluxes.

While I have shown the series winding 71 on the yoke 6, I may dispense with this entirely, by proportioning the finer winding to make up for its removal. When the winding 71 is not used, then the windings 44 and 45 are adjusted to send sufficient flux in reverse direction through the armature as will compensate for the higher rotation of same and the flux due to the permanent magnets or their equivalent.

When the generator is being operated at a low speed and the working circuit closed, the magnetic flux generated by the coils 44 and 45 and which passes through the pole extensions 66 and 67, is relatively small and most of it finds return path through the main portion of the magnetic material of the generator, since the reluctance there-through is considerably less than through the air gaps on both sides of the armature and including the armature but when the current in the working circuit reaches a certain predetermined value, the magnetic flux generated by the coils 44 and 45 divides, a part following the path above outlined and a part passes through the armature as indicated by the upper arrows on the armature of Fig. 4 and I claim that the construction of the pole extensions 66 and 67, whereby they are bent away from the permanent magnets, as herein described, is an important feature of my invention.

When the vehicle is started, to which my improved generator is connected, the same begins to generate current through the winding 70 in the usual manner of a shunt machine. As the speed of the vehicle increases, the voltage on the generator also increases, until at a predetermined point, for which adjustments may be made, the keeper 19 is drawn downward toward the pole tips 14 and 15 and the working circuit as has been previously traced, is closed at contacts 32 and 33. As the speed of the vehicle further increases, the current from the armature and in the working circuit would increase to an abnormal degree and battery would be overcharged and the lamps burned out or other translating devices injured, if means were not provided to limit the output of the generator. This I accomplish through the action of the windings 44 and 45, which operate the keeper 46 at a predetermined speed, the operation of which holds the keeper 19 in position, thereby maintaining contacts 32 and 33 in engagement and subsequently opening the shunt circuit through the contacts 28 and 29. This at once reduces the flux through the armature, due to winding 70 and while the tendency for the increased current through the series winding 71, is to increase the flux through the armature, it is counterbalanced by the series differential acting windings 44 and 45, which drives a flux through the armature in opposition to the winding 71. These windings are so correlated as to balance each other and in consequence a steady current is maintained in the working circuit, even though the speed of the vehicle be increased to an abnormal point. It is also seen that as the current in the working circuit through windings 70 and 71 increases, the flux through the yoke 6 will increase but a portion of this increase of flux is carried through the pole tip 15, keeper 19, pole tip 14 back to the yoke 6. In other words, the tendency is for the pole tips 14 and 15 and keeper 19 to shunt flux, created by windings 70 and 71, away from the armature, thereby aiding in the general regulation of the generator. When the speed of the vehicle decreases to a predetermined point, the windings 44 and 45 release the keeper 46 and the fingers 41 and 42 are released from engagement with 37 and 19 and the working circuit will remain open until the speed increases to such a point as winding 70 will again close contacts 32 and 33 through the attraction of keeper 19.

While I have shown one particular form of my invention, I do not wish to be limited by the exact construction shown, as numerous changes may be made by those skilled in the art without departing from the spirit of the claims.

Having thus described my invention, what I claim, is:

1. In an electric generator the combination of an armature, a source of magnetic flux, pole pieces attached thereto, said pole pieces having extensions inclined away from said source of flux and extending above said armature, electromagnetic windings on said extensions, said windings being in series relation with the armature circuit and adapted to generate a flux through the armature in opposition to the first said source of flux, substantially as described.

2. In an electric generator, the combination of an armature and a working circuit therefor, a plurality of sets of pole pieces carrying flux on opposite sides of said armature, one set of pole pieces having pole shoes attached thereto, said pole shoes carrying a yoke, a plurality of windings on said yoke, one of said windings being in series with the armature in the working circuit, the other winding being in shunt to the armature and out of the working circuit, another set of pole pieces carrying extensions, said extensions having windings in series with the working circuit, but adapted to generate a flux through the armature in an opposite direction to the first mentioned series winding, substantially as described.

3. In an electric generator, the combination of an armature and a working circuit therefor, a source of magnetic flux, a plurality of sets of pole pieces, one pair of said pole pieces provided with pole shoes carrying a yoke, a plurality of windings on said yoke, one of said windings being in series with the working circuit through the armature, the other winding being in shunt to the armature and out of the working circuit, a keeper carrying contacts included in the working circuit, said contacts being open at a speed of rotation of the armature below a substantially predetermined point, said other mentioned pair of pole pieces having shoes and a keeper, said keeper being attracted when the armature speeds above a predetermined point, and said last mentioned keeper controlling said first keeper whereby the first mentioned regulator is held in its operated position as long as said second keeper is operated, substantially as described.

4. In an electric generator, the combination of a rotatable armature, a source of magnetic flux, a working circuit for said armature including a plurality of series windings, a winding in shunt to said armature, a yoke for said shunt winding and one of the series windings, a keeper for the working circuit controlled by the current through the shunt winding and a second keeper for the working circuit controlled by the balance of the series windings in the working circuit.

5. An electric generator comprising a field magnet for the magnetic flux, windings thereon, an armature disposed within the field magnet, a working circuit for the armature current, a plurality of keepers subject to the action of the field fluxes to govern the current in the working circuit, the field fluxes operating said keepers being each independent of the other.

6. An electric generator having field magnets for the magnetic fluxes, windings disposed adjacent thereto, an armature adjacent to the field magnets, a working circuit for the armature current, a plurality of keepers subject to the action of the field fluxes to govern the current in the working circuit, one of said windings adapted to produce a flow of magnetic lines in one direction through the armature, one of said keepers being operated by said magnetic lines, a second winding adapted to produce a flow of magnetic lines in the opposite direction through the armature and the other of said keepers being operated by said last mentioned magnetic lines, substantially as described.

7. An electric generator comprising a field magnet for the magnetic flux, windings thereon, an armature and a working circuit therefor, said field magnet being split into two sections on either side of said armature, a keeper for the working circuit controlled by the magnetic flux in one of said sections, and a second keeper for the working circuit controlled by the magnetic flux in the other of said sections, substantially as described.

8. An electric generator comprising a field magnet for the magnetic flux, windings disposed adjacent to said field magnet, an armature and a working circuit therefor, two keepers for said working circuit, said field magnet being divided into two sections on either side of said armature, said windings consisting of a shunt and series winding on one section and a series winding on the other section whereby the shunt winding controls one keeper and the second mentioned series winding controls the other keeper, substantially as described.

9. An electric generator comprising a field of magnetic material for the magnetic flux in two sections on either side of an armature, windings disposed around the magnetic material on both said sections, a working circuit for the armature current, said working circuit including contacts normally open, but adapted to be closed at a substantially predetermined speed of rotation of the armature by a controlling winding external to the working circuit and disposed on one of said field sections, a second contact normally closed and in the said winding circuit external to the working circuit, but adapted to be opened at a substantially predetermined speed by a controlling winding on the other of said field sections whereby the current in the working circuit is held substantially constant beyond the second predetermined speed point.

10. An electric generator consisting of an armature and field magnet poles divided in two sections on either side of said armature, one section or part of the field magnet poles having pole shoes attached thereto, a working circuit for said armature, a plurality of governing means for said working circuit, one of said circuit governing means being disposed on said pole shoes attached to one pair of the field magnet poles and another of said circuit governing means being disposed on the other of said pair of field magnet poles substantially as and for the purpose described.

11. An electric generator comprising a permanent magnet, having pole pieces, a non-magnetic base for said magnet and pole pieces, other pole pieces mounted on said base, a winding correlated with the second named pole pieces and in series in the working circuit of the armature, a magnetic keeper controlling said circuit, a winding for the second named pole pieces in shunt to said armature, the first named pole pieces having extensions on which are disposed a winding in series with the working circuit of the armature, and a second keeper further controlling said circuit.

12. An electric generator provided with a permanent magnet and armature, a working circuit for the armature, including a series and a series differential acting winding, a winding in shunt to said armature, a yoke for said series and shunt windings, a keeper for the working circuit controlled conjointly by the shunt and series differential acting winding.

13. An electric generator provided with a permanent magnet and armature, a working circuit for the armature including a series and a series differential acting winding, a winding in shunt to said armature, a yoke for said series and shunt windings, pole pieces associated with said yoke, contacts in the series and shunt circuits carried by said pole pieces, the contact in the series circuit being closed by the current in the shunt winding, and the contact in the shunt circuit being opened by the current in the series differential acting winding substantially as described.

14. An electrical generator provided with magnetic field material and an armature, a working circuit for said armature including series and series differential acting windings, a winding in shunt to said armature, a yoke for said series and shunt windings, pole pieces associated with said yoke, said magnetic field material being divided in two sections on either side of said armature, said shunt and series windings acting on one section, and said series differential winding acting on the other of said sections, whereby the shunt and series windings actuate a keeper to close the working circuit of the armature and the series differential acting winding, actuates a second keeper to open the said shunt winding to regulate the current in the working circuit, substantially as described.

15. An electric generator provided with a plurality of sources of magnetic flux, an armature and a working circuit therefor, a base, a plurality of pole pieces mounted in a straight line on said base on one side of said armature and a duplicate set of pole pieces mounted in a straight line on said base on the opposite side of said armature, two of said sources of magnetic flux acting through one set of pole pieces and the armature and the other two sources acting through an independent set of pole pieces and the armature, whereby the current in said armature is controlled to a substantially predetermined value.

16. An electric generator provided with a plurality of sources of magnetic flux, an armature and a working circuit therefor, pole pieces for directing the flux through said armature, said pole pieces being arranged in pairs and magnetically separated, the flux in one pair of pole pieces being in one direction through the armature and the flux in the other pair being at times in both directions, whereby the current in the armature and the working circuit is controlled to a substantially predetermined value.

17. An electric generator provided with an armature and a working circuit therefor, and means for exciting the armature, said means consisting of at least two electromagnets, one of said electromagnets acting on a keeper to close the working circuit, the other electromagnet acting on a keeper to hold the first mentioned keeper in closed position and to open the energizing circuit of the first mentioned electromagnet at a predetermined speed, whereby the working circuit is closed at substantially a predetermined speed and the working circuit is kept closed when one of the armature exciting means is removed at a second substantially predetermined speed.

18. An electric generator, provided with a permanent magnet and armature, a working circuit for said armature, said permanent magnet having pole pieces provided with pole extensions, said extensions having windings thereon forming an electromagnet adapted to send magnetic lines through the armature in opposition to the permanent magnets, a second electro-magnet adapted to send magnetic lines through the armature in conjunction with the permanent magnet but in opposition to the magnetic lines set up by the said first mentioned electro-magnets, said second electro-magnet adapted to close the said working circuit, said first mentioned electro-magnet adapted to hold the working circuit closed, while at the same time serving to open the circuit of said second electro-magnet, thereby holding the current in the working circuit to a substantially predetermined value.

19. An electric generator, provided with an armature, a plurality of sources of magnetic flux, one of said sources being a permanent magnet, one an electro-magnet independent of the permanent magnet and one an electro-magnet mounted on pole extensions of said permanent magnets, the first two sources acting to send flux through the armature in the same direction and the last mentioned to send flux through the armature in an opposite direction to the first two mentioned sources.

20. An electric generator having permanent magnets, an armature and a working circuit therefor, a pair of electromagnets connected in series with the working circuit a pair of spring returned armatures, said spring returned armatures being controlled by said pair of electromagnets, whereby the necessary contacts are operated to regulate the current in the working circuit.

21. In combination, an electric generator having a source of magnetic flux, an armature and a working circuit therefor, a second source of magnetic flux adapted to be added to the first mentioned source, whereby the magnetic field strength and the current output of said armature is increased at low speeds, a keeper, an electromagnet adapted to operate said keeper at a predetermined speed, said keeper when operated serving to alter the electrical connection to the second mentioned source of magnetic flux, whereby the same is removed from action at said predetermined point, substantially as described.

22. In combination, an electric generator having a source of magnetic flux, an armature and a working circuit therefor, a second source of magnetic flux adapted to be added to the first mentioned source, whereby the field strength and the current output of said armature is increased at low speeds, a keeper, an electromagnet adapted to control said keeper, electrical connections to said second source of magnetic flux, said electrical connections adapted to be altered by said keeper when operated, said alteration in the electrical connections serving to remove the second source of magnetic flux from action, said electro-magnet being also adapted to send reverse magnetic flux through said armature, whereby the current in the working circuit is maintained at a substantially constant value as the speed of said armature increases, substantially as described.

23. An electric generator, having a source of magnetic flux, an armature and working circuit therefor, a pair of electro-magnets connected in series with the working circuit, a pair of spring returned keepers, said keepers being controlled by said pair of electromagnets whereby both keepers serve to shunt magnetic flux from said armature as the current in said working circuits increases.

24. In combination, an electric generator having a source of magnetic flux, an armature and a working circuit therefor, an automatic cut out, an electromagnetic winding connected in shunt to said working circuit, a second electromagnetic winding connected in series with said working circuit, said working circuit adapted to be controlled by said cut out, said cut out being operated by said shunt winding, said shunt winding adapted to be removed from circuit by said second winding, said cut out adapted to be held in the operated position after said shunt winding has been removed from the circuit, said second electromagnetic winding having cores bent away from the first mentioned source of magnetic flux, whereby magnetic flux is sent through the armature in reverse direction to the first mentioned source in proportion as the speed of rotation of the armature increases as and for the purpose described.

25. An electric generator, having a source of magnetic flux, an armature and working circuit therefor, a pair of electromagnets connected in series with the working circuit, a pair of spring returned keepers, said keepers being controlled by said pair of electromagnets whereby the necessary contacts are operated to regulate the current in the working circuit.

26. An electric generator having a base, an armature and a working circuit therefor, a plurality of pole pieces mounted in a straight line on said base on one side of said armature and a duplicate set of pole pieces mounted in a straight line on said base on the opposite side of said armature, said pole pieces on either side being spaced apart from each other, a source of magnetic flux for one set of pole pieces, electro-magnetic coils carried above said set of pole pieces and connected in the working circuit and a spring supported keeper operated by said coils to control the working circuit.

27. An electric generator having a base, a direct current armature and a working circuit therefor, a plurality of pole pieces spaced apart but mounted in a straight line on said base on one side of said armature and a duplicate set of pole pieces mounted in a similar manner on the base on the other side of said armature, permanent magnets for supplying magnetic flux to one set of said pole pieces, electro-magnetic coils mounted above said set of pole pieces and connected in circuit with said armature, a keeper associated with said coils and under their control whereby when said keeper is operated, the working circuit is kept closed.

In testimony whereof I affix my signature in the presence of two witnesses.

JAMES M. WILSON.

Witnesses:
WILLIAM J. HART,
RICHARD H. CUNNINGHAM.

Copies of this patent may be obtained for five cents each, by addressing the "Commissioner of Patents, Washington, D. C."